INVENTOR.
FRITS CREMER

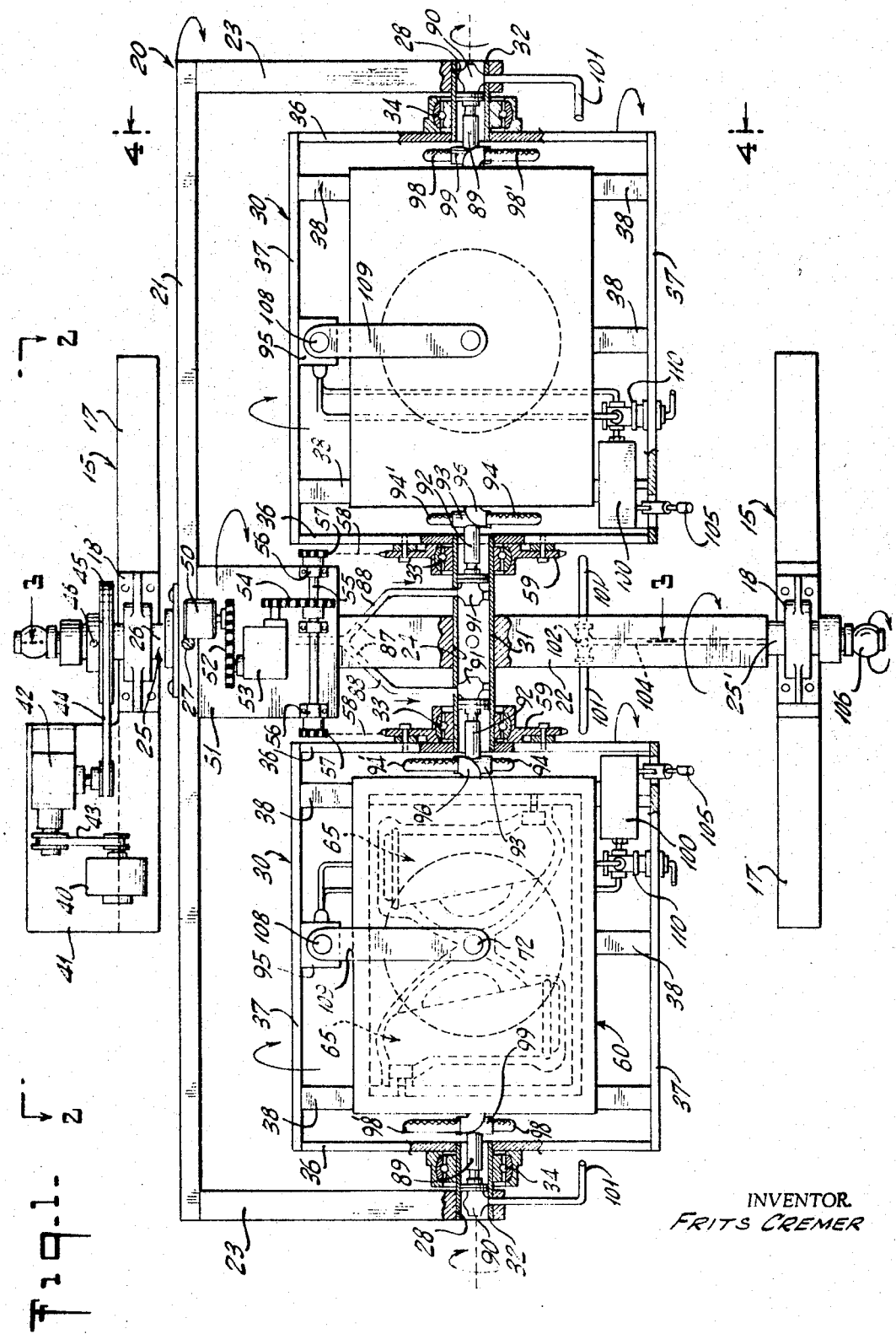

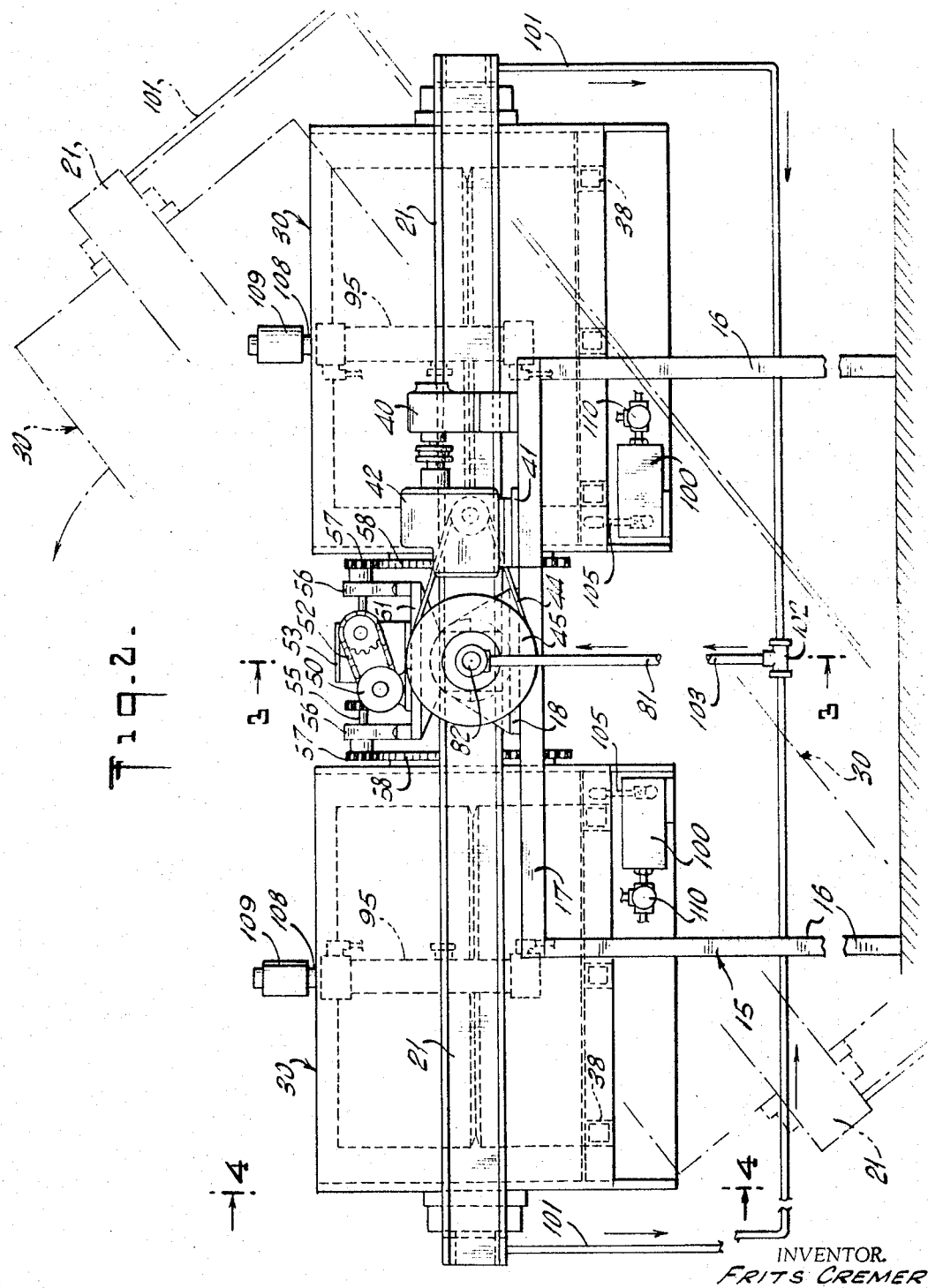

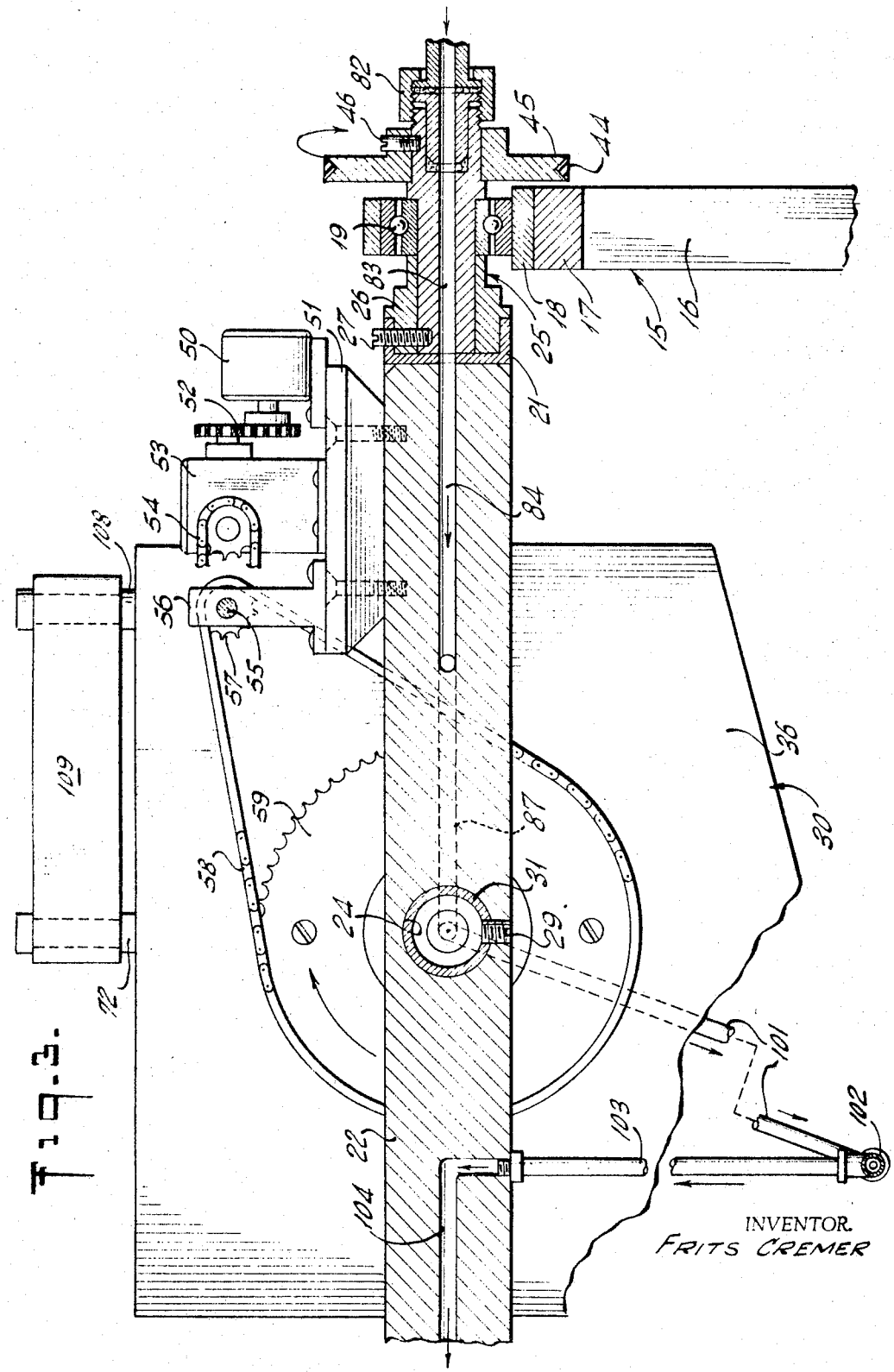

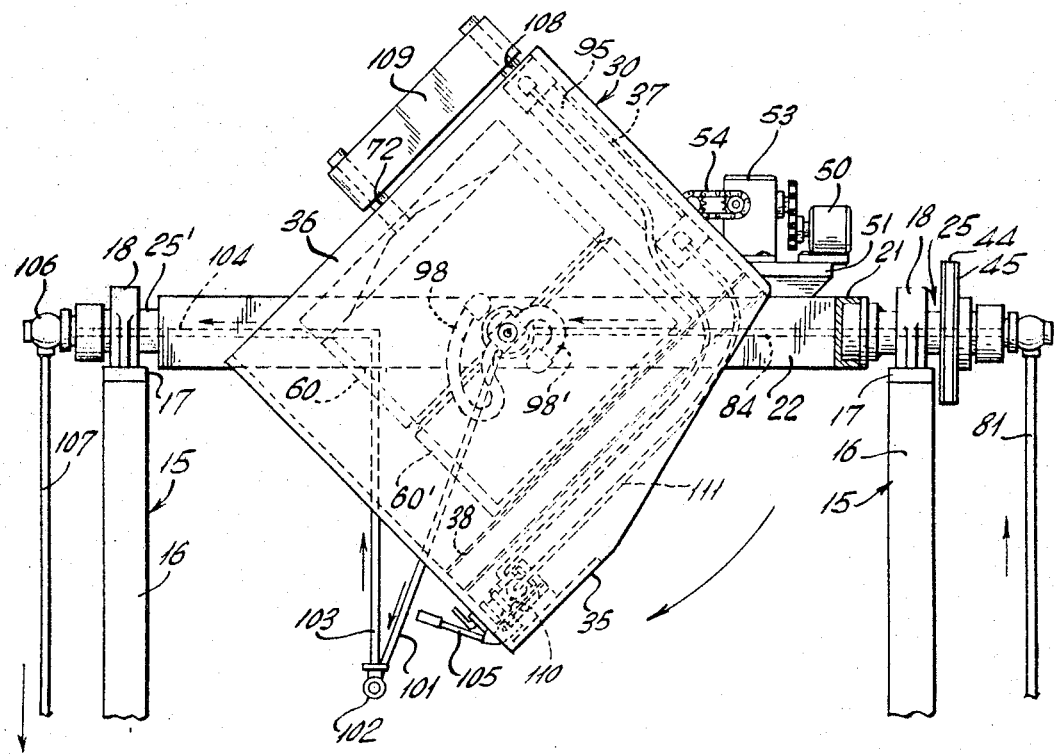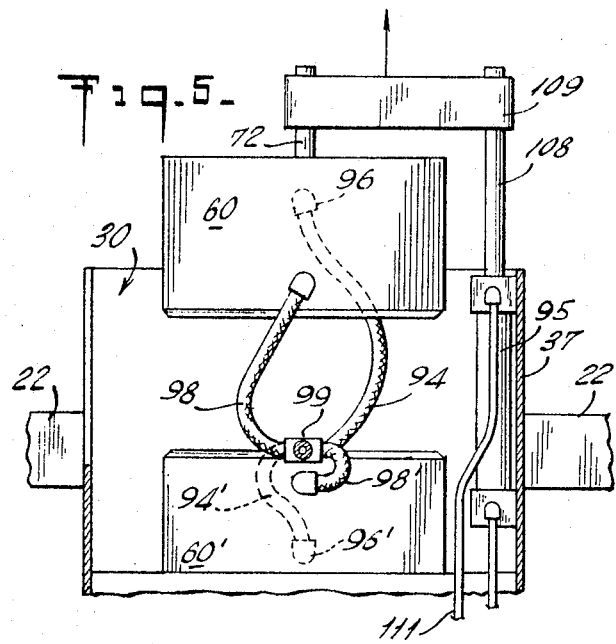

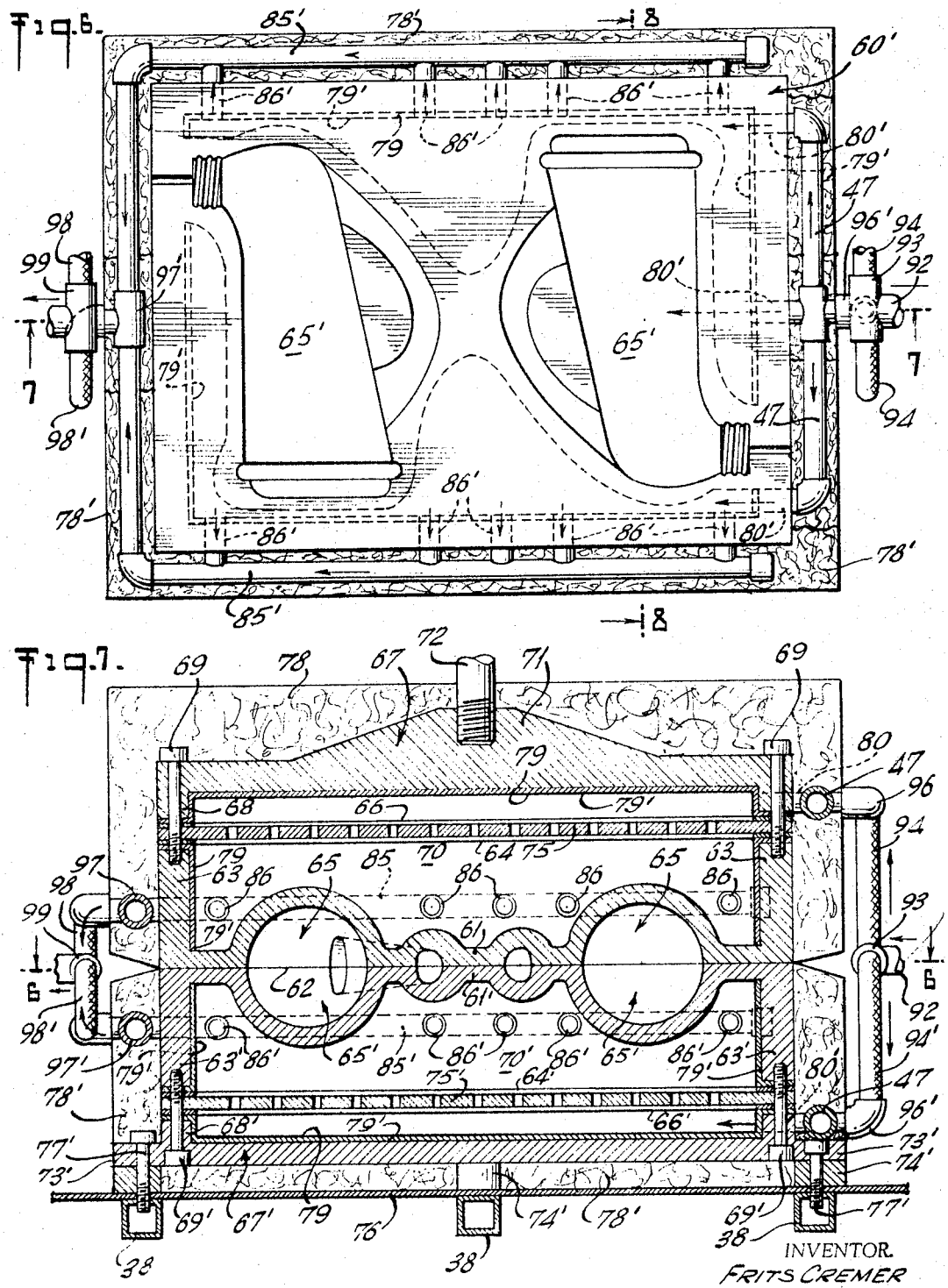

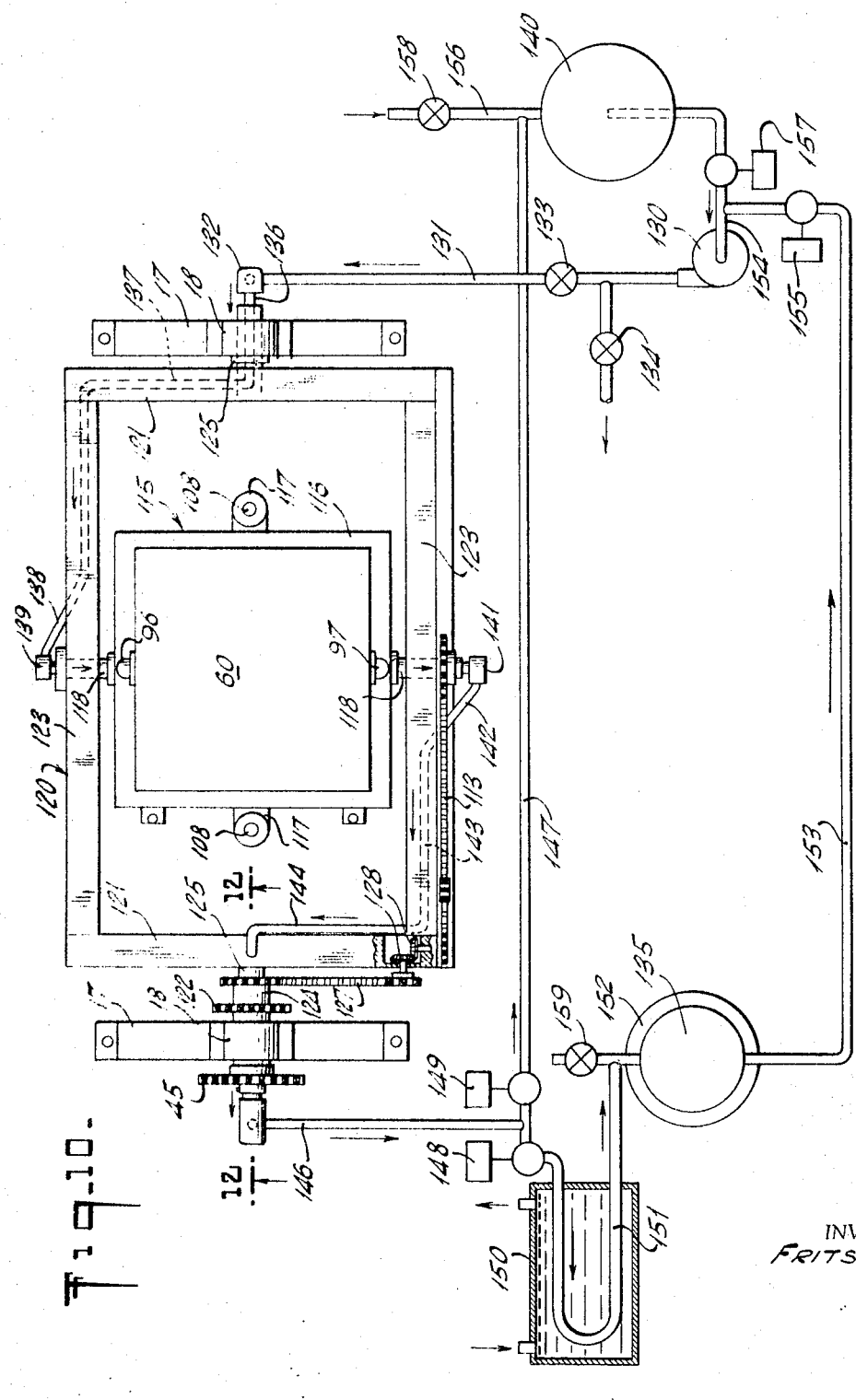

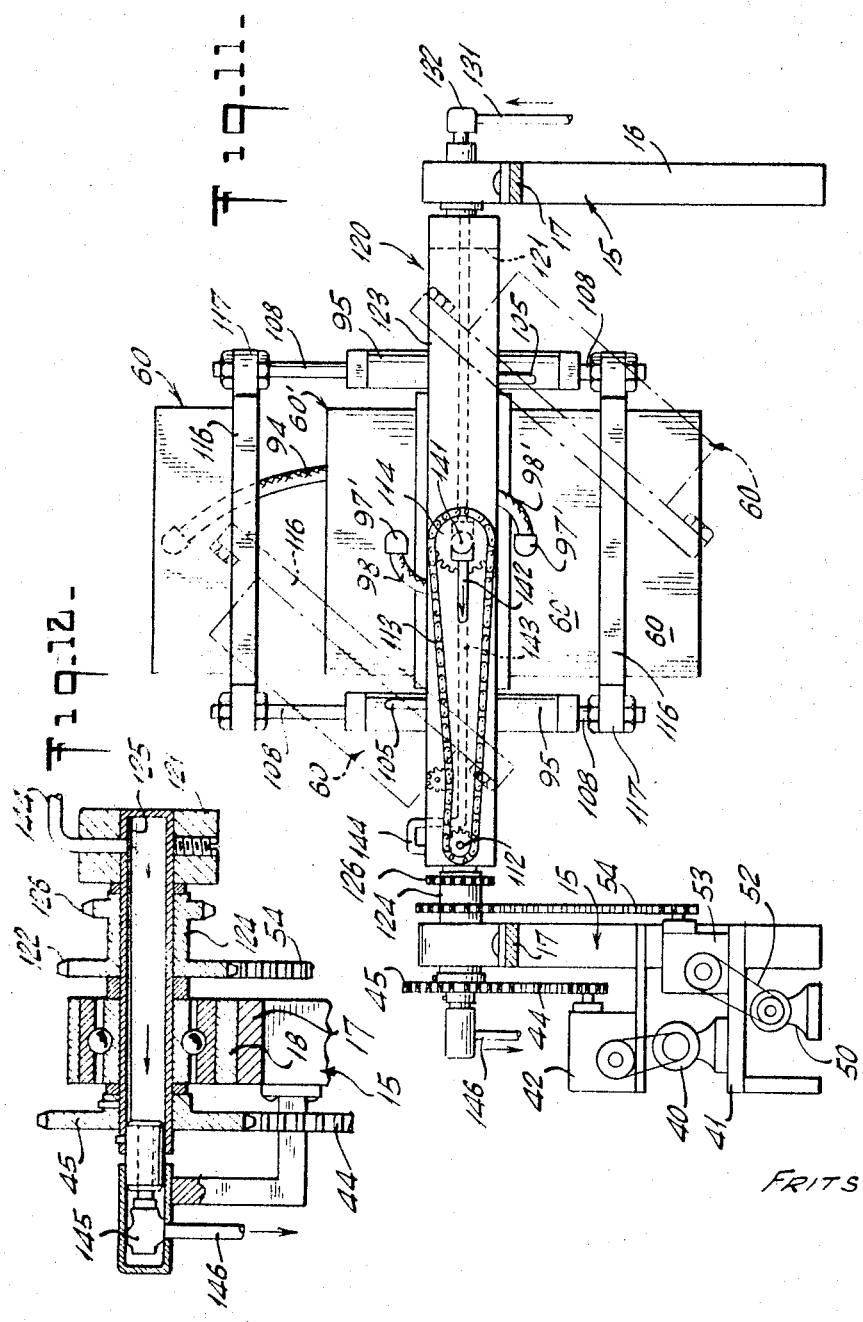

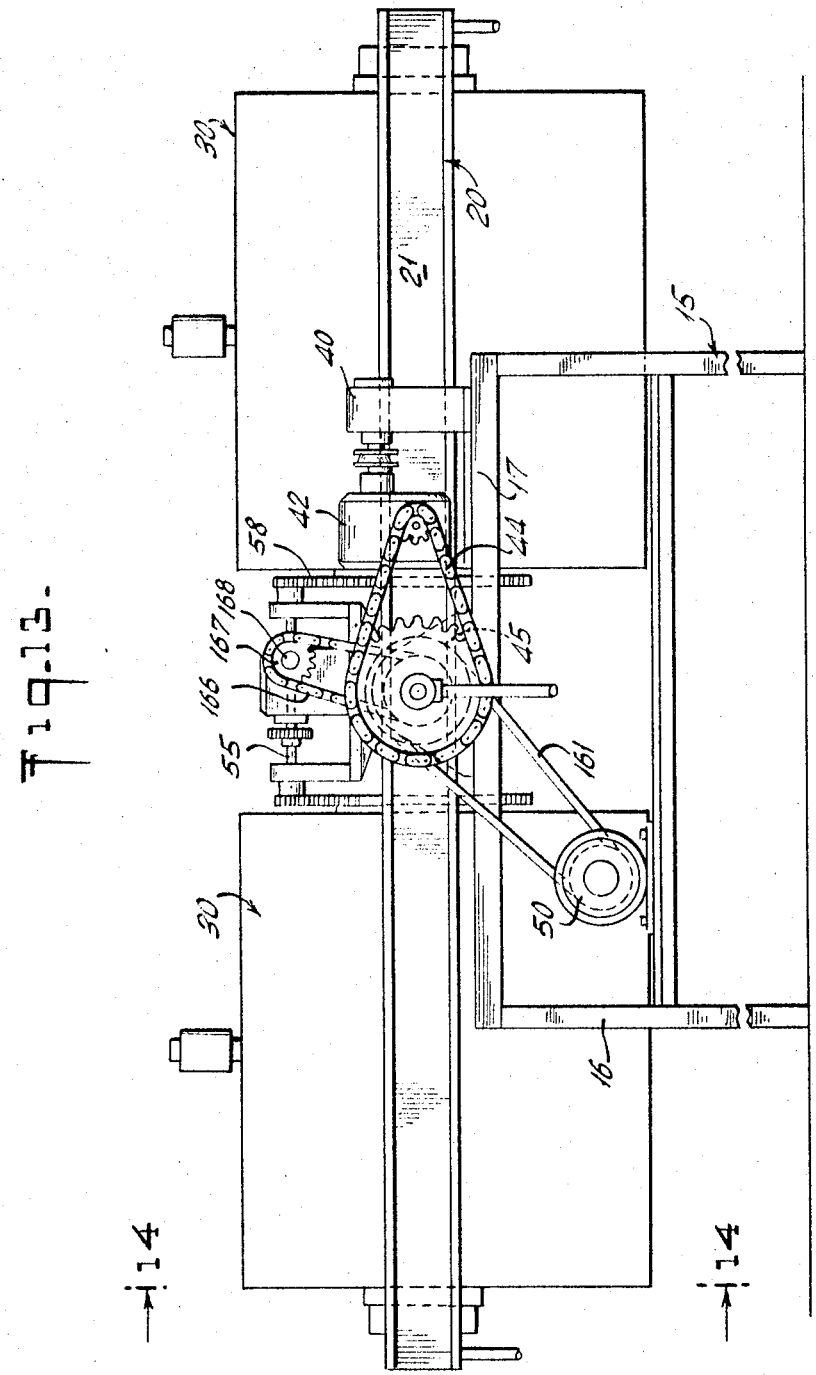

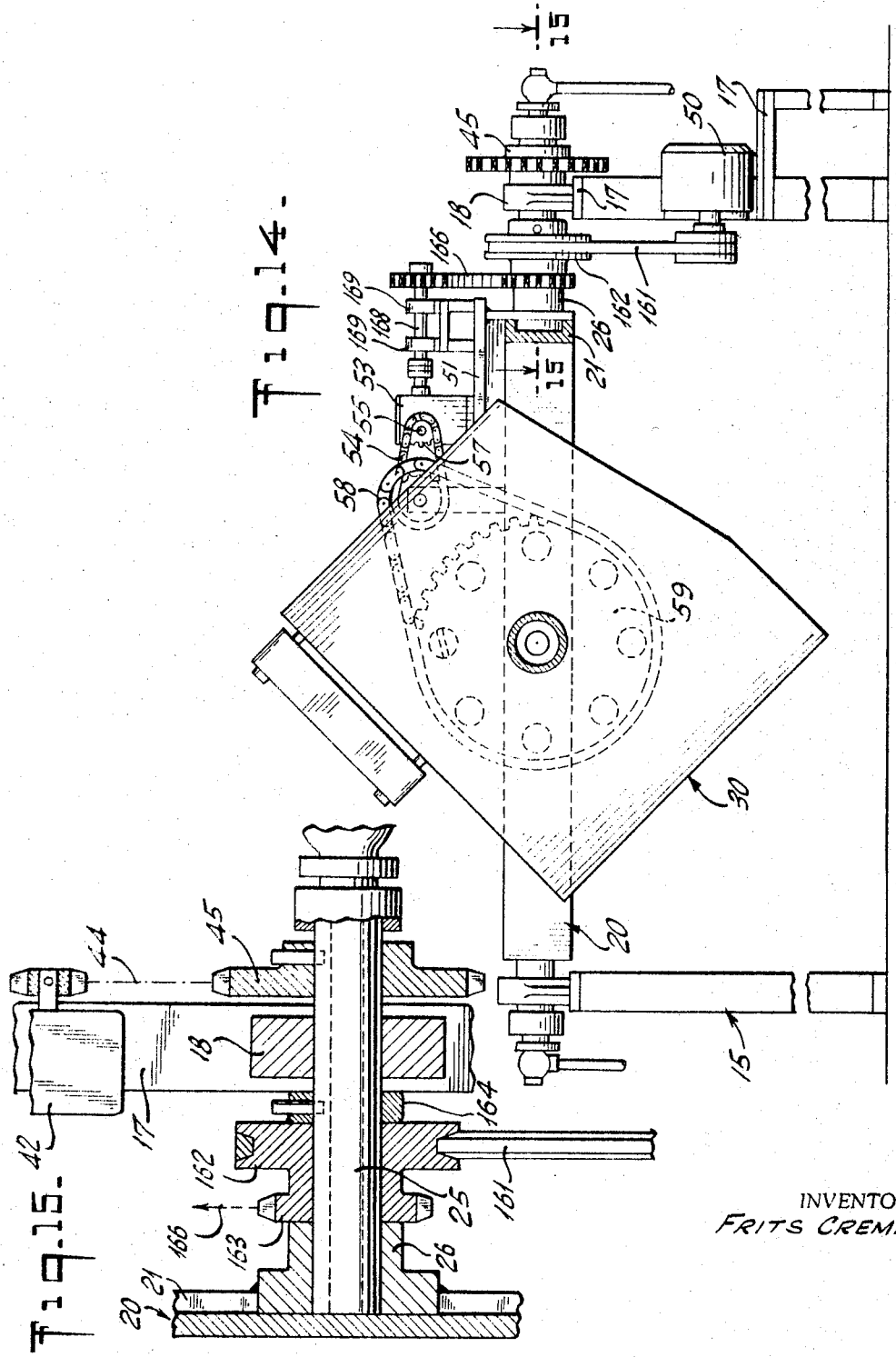

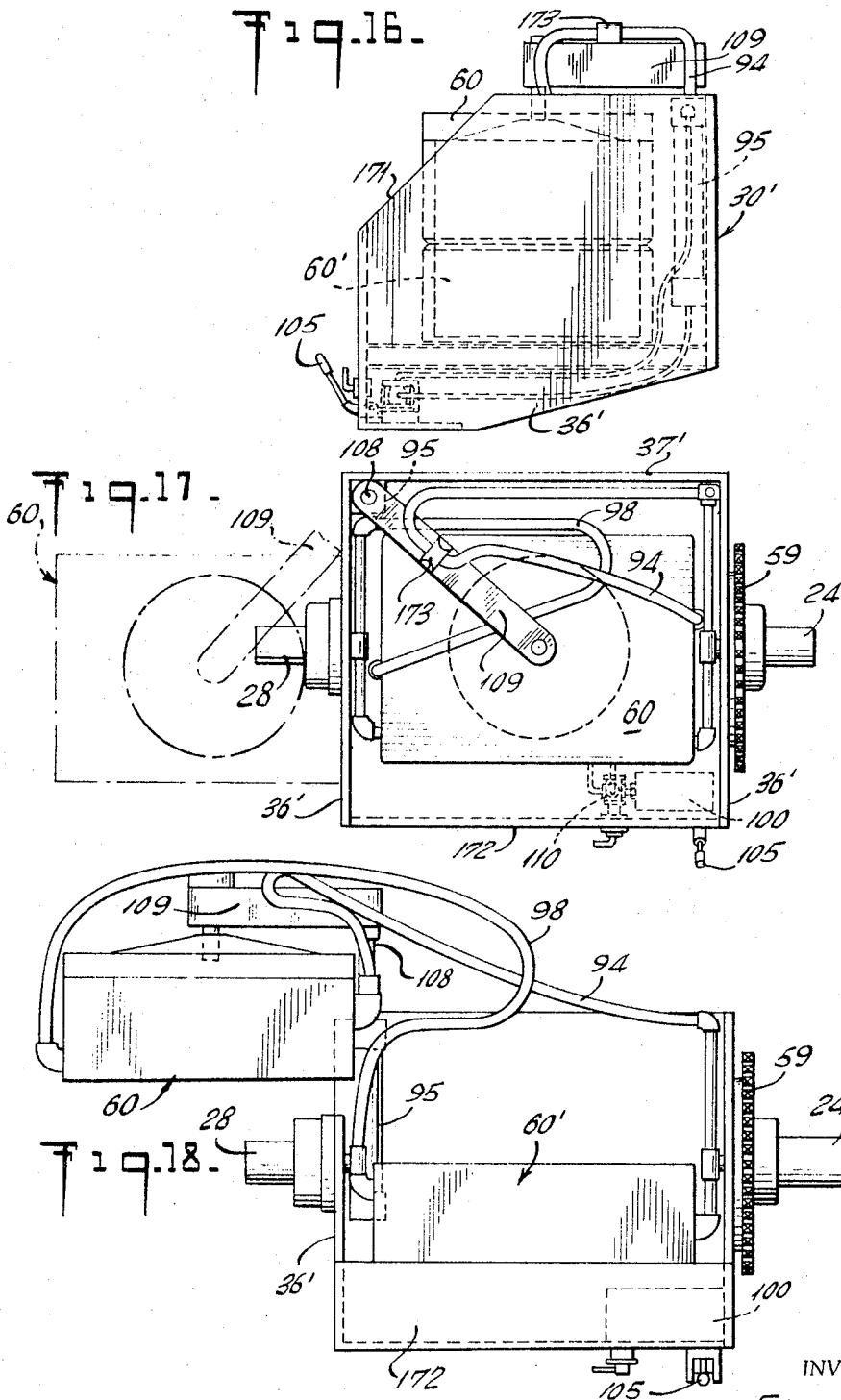

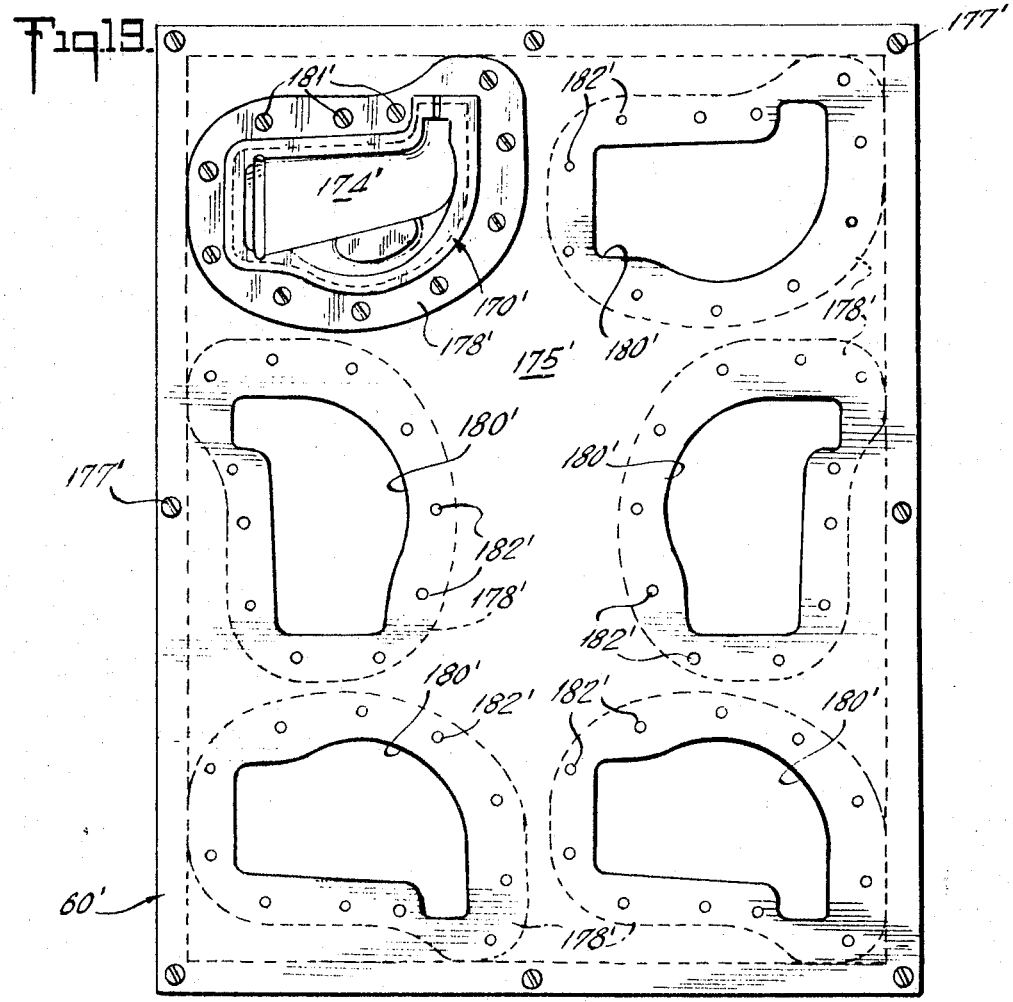
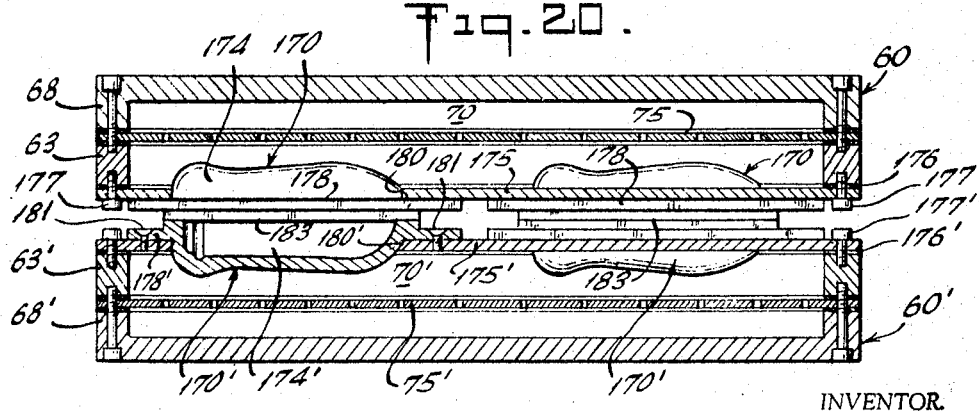

United States Patent Office 3,454,988
Patented July 15, 1969

3,454,988
APPARATUS FOR MOLDING HOLLOW ARTICLES FROM A SYNTHETIC RESIN
Frits Cremer, New York, N.Y., assignor, by mesne assignments, to Blazon, Inc., a corporation of Ohio
Continuation of application Ser. No. 335,317, Jan. 2, 1964. This application Aug. 29, 1966, Ser. No. 584,293
Int. Cl. B29d 23/00
U.S. Cl. 18—26
16 Claims

ABSTRACT OF THE DISCLOSURE

Rotational molding of material which is heated and cooled during the molding cycle. Molds are heated and cooled by fluid circulated past the bearings of apparatus for simultaneously rotating the molds about different axes, successive volumes of the fluid being at different temperatures, but fluid flows unidirectionally through the machine at any given period of fluid flow. Molds are preferably mounted for interchangeability in the vessels containing the fluid and the opening and closing of the molds may be powered.

---

This application is a continuation of my application Ser. No. 335,317, filed on Jan. 2, 1964, and now abandoned.

This invention relates to apparatus for molding hollow articles from natural or synthetic powder or liquid resins and, more particularly, to improved means for heating and cooling rotatable molds and improved means for effecting ready separation of the mold halves for charging and for extraction of molded articles therefrom.

In the molding of hollow articles, a closed mold is provided with a predetermined charge of the raw material and then this mold is rotated about two axes perpendicular to each other as the charge assumes a more or less fluid form. This causes the charge to coat the walls of the mold in a relatively uniform layer and to form a hollow article whose exterior contour is determined by the shape of the mold cavities. In the molding of hollow articles from synthetic resin material, and particularly from polyethylene or vinyl plastics such as, for example, powdered polyethylene or polyvinyl chloride (PVC), the initial charge must be heated during distribution over the surfaces of the mold cavity. Thereafter, the charge must be cooled for handling without damage. Following this, the mold halves are separated so that the molded articles may be removed from the mold and the molds recharged.

Previous arrangements have been proposed for heating and cooling the molds. In the most common procedure, the entire molding apparatus, after the molds have received their charge, is placed in a heating over for a suitable time so that the apparatus is heated while the molds are being rotated. After a predetermined time interval, the apparatus is removed from the heating oven and subjected to a cooling operation. A primary problem encountered in the cooling operation, particularly when using a liquid coolant, is the leaking of coolant into the mold cavities. To avoid such leakage of liquid coolant into the mold cavities, resort has been had to air or gaseous cooling, as by blowing a blast of air over the molds, thus increasing the cycle time due to the longer time required for air cooling as compared to liquid cooling. This particular procedure is thus relatively expensive and time consuming, and results in a relatively low output per unit of apparatus.

Other arrangements have been proposed in which electrical resistance heating or the like has been used to heat the molds. This has the disadvantage that such resistance elements have a high heat capacity and therefore require a quite considerable time for cooling in order to reduce the temperature of the molds after the heating operation has been completed.

A further expedient which has been proposed is to provide a jacket or the like around the molds and to supply a heating fluid to this jacket when the molds are closed. In this arrangement, the jacket is completed only when the two mold halves are in engagement with each other. After the fluid heating medium has been used to heat the molds, it is withdrawn and liquid coolant may be supplied to the heating jacket. The disadvantage of this arrangement is that, when the two mold halves are separated, moisture may enter either or both of the mold halves. Other difficulties are encountered in trying to maintain a tight seal, by means of a gasket, between the mold cavities and the surrounding heating jacket or chamber. Consequently, this particular arrangement has not met with wide acceptance in the art.

In accordance with the present invention, the foregoing difficulties with prior are arrangements are overcome in a novel manner by providing each mold half with an individual heating chamber which is permanently fluid-tightly sealed or isolated from the partial mold cavity of the associated mold half. Thereby, the difficulties of providing a fluid-tight seal between the heating chamber and the mold cavity are obviated.

A feature of the invention is the provision of suitable actuator means associated with the two mold halves and operable under manual control to rapidly separate the two mold halves, when an article has been completely molded, and to rapidly reengage the two mold halves to receive a fresh charge of the raw material.

In accordance with the invention, the complete molds, each comprising two mold halves in assembled relation, are arranged to be rotated about a pair of axes which are mutually perpendicular to each other. Thus, for example, a frame may be mounted in a pair of supports so that it may be rotated about a first axis, and suitable driving means are provided to rotate the frame about this first axis. This frame supports at least one mold, and preferably a pair or more of molds, which molds are mounted on the frame for rotation about a second axis which is perpendicular to the first axis. Driving means are provided for rotating the molds about this second axis while the frame is being rotated about the first axis, and such driving means may be the same as the driving means used to rotate the frame or individual driving means may be provided on the frame for rotating the molds about the second axis.

A source of heating fluid is provided and also a source of fluid coolant, and these sources are connected, through suitable conduit and valve arrangements, to the heating chambers of the two mold halves, the connections involving rotatable conduit joints.

The heating fluid or the fluid coolant is arranged to enter the heating chamber at a certain area thereof and then to flow through a perforated distribution plate into contact with the heat conductive inner wall of the partial mold cavity of the associated mold half, the heating fluid or fluid coolant being then exhausted from that portion of the chamber in contact with the wall of the partial mold cavity. This assures an even heating and cooling of the wall of the partial mold cavity.

For an understanding of the principles of the invention, reference is made to the following description of typical embodiments thereof as illustrated in the accompanying drawings. In the drawings:

FIG. 1 is a plan view of molding apparatus embodying the invention;

FIG. 2 is an elevational view taken on the line 2—2 of FIG. 1;

FIG. 3 is a cross sectional view of the apparatus taken on the line 3—3 of FIGS. 1 and 2;

FIG. 4 is a cross sectional view of the apparatus taken on the line 4—4 of FIG. 2;

FIG. 5 is an elevational view, partly in section, of one of the molds showing the means for separating the two mold halves from each other and for moving them back into engagement with each other;

FIG. 6 is a plan view of a mold half taken along the parting plane of the mold indicated by the line 6—6 of FIG. 7;

FIG. 7 is a cross sectional view of a mold taken along the line 7—7 of FIG 6;

FIG. 10 is a plan view of an alternative embodiment of the invention, with the source of heating fluid and the source of fluid coolant being illustrated schematically;

FIG. 11 is an elevational view, partly in section, of the apparatus shown in FIG. 10;

FIG. 12 is a detailed cross sectional view taken along the line 12—12 of FIG. 10 and illustrating the means for rotating the frame and for rotating the mold;

FIG. 13 is an elevational view, corresponding to FIG. 2, but illustrating an alternative driving arrangement for rotating the molds;

FIG. 14 is an elevational view, partly in section, taken on the line 14—14 of FIG. 13;

FIG. 15 is a sectional view taken on the line 15—15 of FIG. 14;

FIG. 16 is an elevational view, corresponding generally to FIGS. 3 and 4, but illustrating an alternative arrangement for separating the mold halves;

FIG. 17 is a top plan view of FIG. 16;

FIG. 18 is a front elevational view corresponding to FIGS. 16 and 17 but illustrating the upper mold half swung out of the way;

FIG. 19 is a top plan view of a mold half illustrating a support plate arranged to receive, interchangeably, various forms of mold cavities; and FIG. 20 is a transverse sectional view taken on the line 20—20 of FIG. 19.

Figure 8:
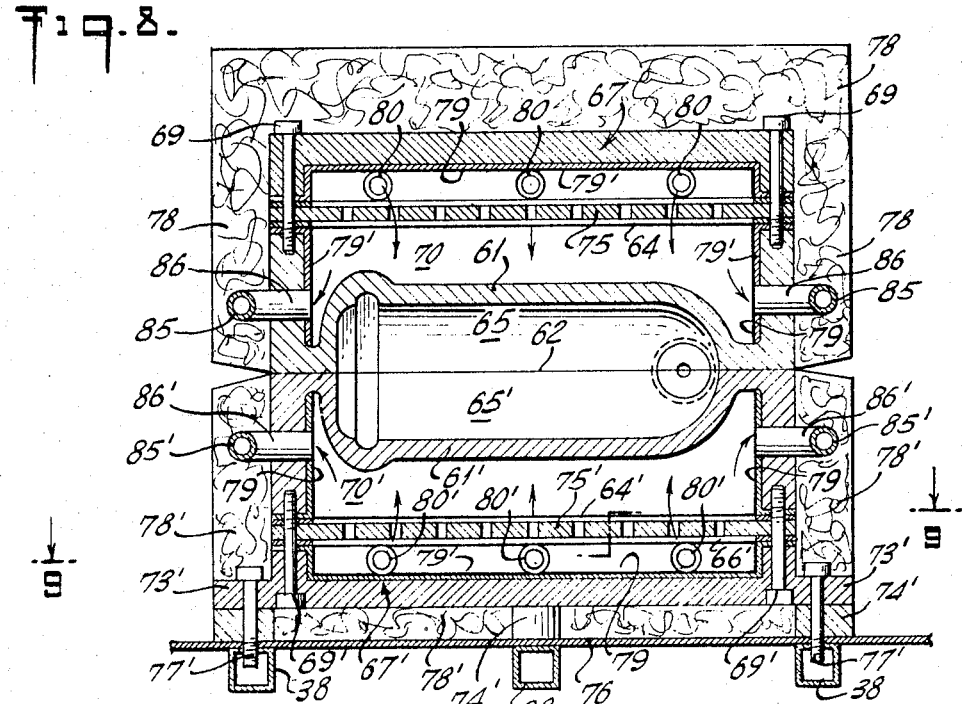
FIG. 8 is a transverse sectional view of the mold taken along the line 8—8 of FIG. 7.

Referring first to that embodiment of the invention shown in FIGS. 1 through 9, the apparatus therein illustrated comprises a pair of generally upright supports 15 each comprising a pair of uprights 16 and one or more cross members 17. Adjacent its central portion, each cross member 17 supports a pillow block bearing 18 containing an antifriction bearing 19 for rotatably or oscillatably supporting a frame 20.

Frame 20 is supported in the bearings 19 by generally tubular trunnions 25 and 25' through which the conduits and connections for introducing heating and cooling fluid to the molds, and for withdrawing and cooling fluid therefrom, are led. The heating and cooling fluid enters through conduits and fixtures disposed in the trunnion 25 and is withdrawn through conduits and fixtures disposed in the trunnion 25'. The inner end of trunnion 25 has a sleeve 26 thereon, and sleeve 26 and trunnion 25 are anchored against rotation with respect to frame 20 by means of a setscrew 27 or the like which extends through a transverse frame member 21 which is generally channel shaped as best seen in FIG. 3.

Frame 20 includes a central member 22 which extends longitudinally of the axis of rotation of the frame and is anchored, at one end, to the cross member 21. Trunnion 25' is secured to the opposite end of central member 22. The frame also includes a pair of side members 23 each secured at one end to an end of the cross member 21.

Substantially midway of its length, central member 22 is formed wtih a circular aperture therethrough perpendicular to the axis of rotation, this aperture being indicated at 24. Aperture 24 receives a tubular member 31 which serves as a rotatable support for the two molds described more fully hereinafter. In axial alignment with aperture 24, each of the side members 23 is formed with a circular aperture 28 each of which receives a tubular trunnion 32, these serving as the supports for the other sides of the pair of molds. Tubular member or trunnion 31 (FIG. 3) is suitably secured against rotation relative to frame member 22 by means of a setscrew 29, and the side trunnions 32 are likewise secured against rotation relative to side frame members 23.

In the embodiment of the invention illustrated in FIGS. 1 through 9, there are a pair of molds each supported between central member 22 and a side member 23 of frame 20. For this purpose, there are a pair of substantially rectangularly open-ended mold housings 30 which are rotatably supported upon trunnions 31 and 32. The lateral walls of housings 30 are coaxially centrally apertured to receive trunnions 31 and 32. Trunnion or tubular member 31 has mounted, on each end thereof, an antifriction bearing 33 having its inner race fixed to tubular trunnion 31 and its outer race secured to the adjacent side wall 36 of a housing 30. Similarly, the inner end of each tubular trunnion 32 has an antifriction bearing 34 thereon, each antifriction bearing 34 having its inner race secured to a trunnion 32 and its outer race secured to an outer side wall 36 of a housing 30.

Referring particularly to FIGS. 1 through 5, each housing 30, in addition to its side walls 36, 36, has end walls 37, 37. The lower edges of end walls 37, 37 are interconnected by rectangular tubular cross members 38 which form a support for the molds. As best seen in FIGS. 3 and 4, side walls 36 are trapezoidal with their lower edges sloping downwardly from one end wall 37 to a point intermediate the end walls, after which the lower edge extends perpendicularly to the other wall 37. For a purpose to be described, the deepest portions of the lower edges of side walls 36 are interconnected by a cross plate 35, best seen in FIG. 4.

Suitable means are provided for rotating frame 20 about the common axis of bearings 19, and also for rotating housings 30 about the common axis of trunnions 31 and 32. For this purpose, a mounting base 41 is secured to front support 15 and supports a motor 40 which drives a reduction gearing 42 through a belt 43. Reduction gearing 42 is provided with a V output pulley which, through a belt 44, drives a larger diameter V pulley 45 secured to trunnion 25 by a setscrew 46. Thus, through the described interconnections, when motor 40 is energized it rotates or oscillates, in accordance with the desired mode of operation, frame 20 about the common axis of bearings 19.

Mold housings 30, and the molds therein, are rotated by suitable driving means which are fixedly mounted on frame 20. For this purpose, a mounting plate 51 is secured to center member 22 of frame 20 and supports a motor 50 connected by a chain drive 52 to a reduction gearing 53. Through a chain drive 54, reduction gearing 53 drives a shaft 55 mounted in bearings 56 on plate 51. Small sprockets 57 secured to the ends of shaft 55 are connected by respective chain drives 58 to large sprockets 59 secured to inner side walls 36 of housings 30 so that the housings may be rotated about the common axis of trunnions 31 and 32 upon energization of motor 50.

By the described driving arrangements, it will be apparent that frame 20 may be rotated or oscillated about the common axis of bearings 19 while mold housings 30 are rotated about the common axis of trunnions 31 and 32. Thus, and in effect, mold housings 30, and the molds therein, are rotated or oscillated about two mutually perpeidicular axes.

An important feature of the invention is the construction of the molds, each of which is a two-part mold comprising an upper half 60 and a lower half 60'. Referring more particularly to FIGS. 5 through 9, mold halves 60 and 60' are substantially identical except for the lower or outer wall of mold half 60' and the upper or outer wall of mold half 60. In the particular embodiment illustrated, molds 60, 60' are substantially rectangular in plan. The molds are constructed of heat conductive metal, and each mold includes transversely extending wall means 61, 61', suitably contoured to define a respective mold cavity 65 or 65', the mold cavities mating, when the molds are engaged along the parting plane 62, to define the complete mold cavity. In the illustrated embodiment, there are a pair of mold cavities 65, 65, in each mold half, and these mold cavities are designed to form a pouring filler such as may be used, for example, in filling storage batteries at service stations. Extending from the four peripheral edges of the transverse wall means 61 are side walls 63, 63'.

Side walls 63, 63' terminate in planes which are parallel to parting plane 62. On the outer edges of side walls 63' there is positioned a gasket 64, 64' and against this gasket is placed a rectangular and perforated fluid distribution plate 75, 75'. Against the opposite side of each distributor plates 75 or 75' there is placed a second gasket 66, 66'.

The outer ends of mold halves 60 and 60' are closed by closure plates 67, 67'. Plate 67 is generally rectangular in plan and has a peripheral rectangular cross section rim or rib 68 bearing against gasket 66, the parts being held in fluid-tight relation by studs 69 extending through plate 67, rib 68 and plate 75, and threaded into threaded apertures in wall 63. Plate 67 is formed with a central thickened portion 71 which projects outwardly of mold half 60 and has a threaded recess into which is threaded a rod 72 for a purpose to be described.

Closure plate 67' extends outwardly of side wall 63' and is generally rectangular in plan, this closure plate being formed with a rectangular cross section rib 68' engaging gasket 66'. The parts are held in assembled relation by studs 69' extending through plate 67', the gaskets 64' and 66' and the distributor plate 75', and threaded into wall 63'.

The outward projection of plate 67' provides a flange 73' which rests on rectangular cross section struts 74' each aligned with one of the outer transverse members 38 of a housing 30. A relatively thin plate 76 is interposed between struts 74' and cross members 38. There is a third strut 74' which is placed between closure plate 67' and the central cross member 38, with plate 76 being interposed between this strut and the associated cross member 38. Studs 77' secure flange 73' to cross members 38 and thus to the housing 30, so that lower mold half 60' is fixed against movement relative to housing 30. Both mold halves are encased in suitable heat insulation material 78, 78'.

The transverse wall means 61, 61' in association with side walls 63, 63' and rims 68, 68' form chambers 70, 70' for receiving heating fluid and liquid coolant. This forms a very important feature of the present invention, as the fluid-tight sealing or isolation of these chambers from the mold cavities absolutely prevents entrance of moisture into the mold cavities or accumulation of moisture along the surfaces defining parting plane 62. To conserve heat and cold within the chambers 70, 70', each of these chambers is provided with a heat and cold reflecting lining 79; covering all of the surfaces thereof except the wall means 61, 61', where it is desired that heat be transferred to the mold cavities and heat be extracted from the mold cavities.

The means for interchangeably circulating a heating or cooling fluid through the chambers 70, 70' will now be described. In the first place, it should be noted that distributing plates 75, 75' divide each heating chamber 70, 70' into a heating or cooling fluid inlet section disposed outwardly of the associated distributor plate 75 or 75' and a heating or cooling fluid outlet section disposed between the associated plate 75 or 75' and the transverse wall means 61 or 61'. Distributor plates 75, 75' effect a uniform distribution of the entering heating or cooling fluid over the surface of heat conductive transverse wall means 61, 61' and thus effect uniform heat distribution to mold cavities 65, 65' or uniform cooling of the latter.

Figure 9:
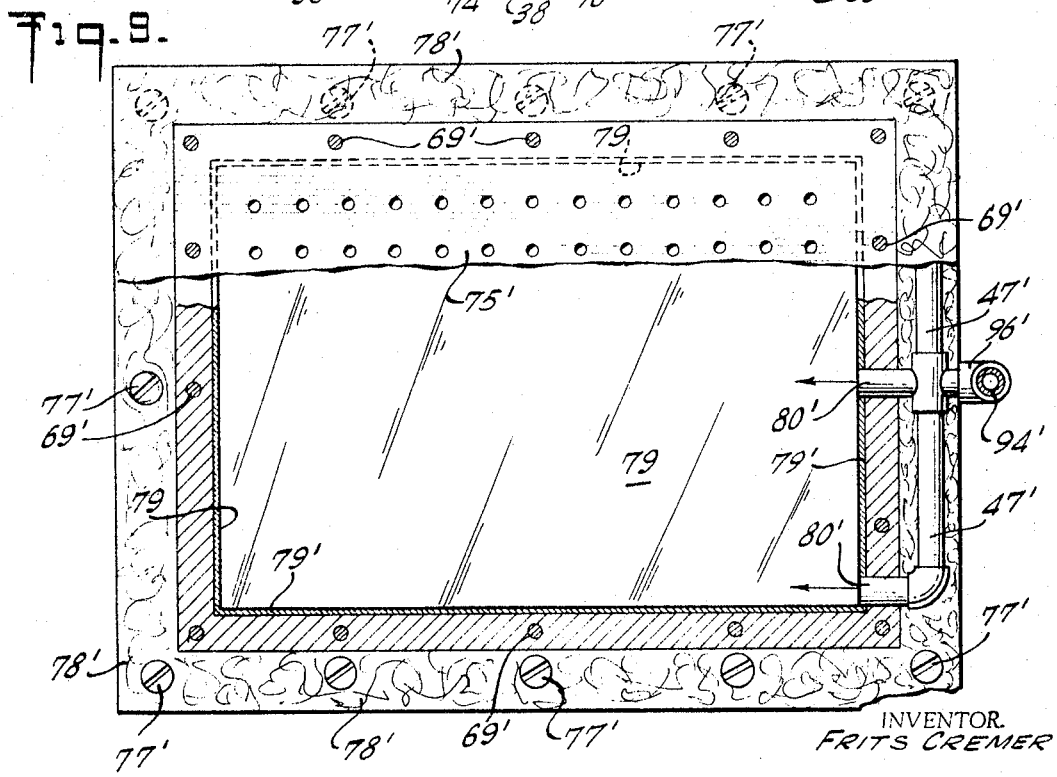
FIG. 9 is a sectional view of one mold half, taken along the line 9—9 of FIG. 8, and illustrating a distributing plate for the heating and cooling medium.

Heating or cooling fluid is supplied to the inlet portion of each chamber 70, 70' by means of inlet nipples 80, 80' threaded into inlet apertures in the side wall or rim 68, 68' nearest to central member 22 of the frame 20. This is best seen in FIGS. 7, 8 and 9. Outlet manifolds, 85 or 85', extend along opposite side wall 63 or 63' of each mold half, and a series of nipples 86, 86' along each outlet manifold establish communication between the respective manifold and the inner part or outlet section of the chamber 70 or 70'. Thus, the heating or cooling fluid enters through the nipples 80, 80' into the outer portion of each of the chambers 70, 70' and then passes through the associated distribution plate 75 or 75' into the inner portion of the associated heating chamber wherein it is in direct heat conducting contact with the transverse wall means 61 or 61' of the mold cavities and which isolate these mold cavities from the chambers 70, 70'. The heating or cooling fluid is then returned to its source through the nipples 86 and the manifolds 85, 85'.

Referring to FIGS. 1 through 4, the heating or cooling liquid is delivered through a pipe or conduit 81 which, by means of a fitting 82, is connected to a passage 83 extending axially of trunnion 25. Fitting 82 may be any suitable commercial fitting arranged to provide a fluid-tight seal between two relatively rotating parts. For example, a Barco rotating fitting may be used. The inner end of passage 83 communicates with a passage 84 extending axially from one end of member 22 for a distance toward the center thereof. At a point between front support 15 and aperture 24 of member 22 passage 84 communicates with diverging branch passages 87 (FIG. 1) which, through pipes or conduits 88, are connected to fittings 91 within trunnion 31, the fittings 91 being of the same nature as the fitting 82. Conduits 92 connect fittings 91 to T's 93, the conduits 92 being connected to the stems of T's 93. Flexible conduits 94, 94', which are flexible for a purpose to be described, connect the branches of T's 93 to elbows 96, 96' connected to inlet manifolds 47, 47' to which are connected the inlet nipples 80, 80'. In this way, a supply conduit means is formed for supplying the fluid to the inlet conduit means which is formed by the inlet manifolds and the inlet nipples connected thereto.

Heating or cooling fluid entering the outlet manifolds 85, 85' flows through T's 97, 97' into flexible conduits 98, 98', and into T's 99. Each T 99 is connected by a conduit 89 to a rotatable pipe fitting 90, which is substantially identical with the fittings 82 and 91. Conduits 101 connect fittings 90 to the branches of a T 102. A pipe or conduit 103 connects the stem of T 102 to a bore 104 in center frame member 22, the bore 104 extending radially and then axially of member 22. By a construction which is the same as that described with reference to that end of member 22 connected to trunnion 25, the return fluid passes through a rotatable fitting, such as already described, in trunnion 25' and then to an elbow 106 to which is connected an outlet conduit or pipe 107. Pipe 107 leads back to the source of the fluid.

By a suitable system of selector valves connected between the sources of heating and cooling fluid and conduits 81 and 107, either heating fluid or cooling fluid may be directed into conduit 81 from the source of heating fluid or cooling fluid, respectively, and, after heating or cooling the mold halves, as the case may be, be returned to the particular source through conduit 107. All this can take place while the molds are being rotated about the two mutually perpendicular axes, due to the use of the rotatable fittings such as 82, 91 and 90. Thus, this structure forms a discharge conduit means for receiving the fluid from the outlet conduit means formed by the manifolds 85, 85'.

As is particularly apparent from FIGS. 7 and 8, the transverse perforated partitions 75 and 75' divide the chambers so that each chamber has an inlet section and an outlet section, and of course part of the outlet sections are respectively defined by the imperforate mold walls 61, 61'. Furthermore, it will be noted that the outlet sections are of a volume which is substantially greater than the volume of the inlet sections. As a result of providing the inlet sections with volumes substantially smaller than the volumes of the outlet sections the fluid initially entering the inlet sections will be retarded by the perforated partitions so as to completely fill the inlet sections before any substantial filling of the outlet sections can occur and in this way a substantially uniform distribution of the fluid throughout the entire outlet sections is achieved to provide uniform heating or cooling at the several molds.

A further feature of the invention is the provision for the quick opening and closing of the respective molds for charging the molds and for removing a molded article therefrom. For this purpose, a fluid pressure actuator 95 is mounted on a wall of each of the housings 30, and has its piston 108 connected to a crosshead 109 to which is secured the aforementioned threaded shaft 72. This is best illustrated in FIG. 5. A reservoir 100, in association with a pump having a manual operating handle 105, is mounted on the plate 35. The pump and reservoir 100 are connected to a selector valve 110 which is, in turn, connected to actuator 95 by conduits 111. By proper positioning of selector valve 110, actuation of pump handle 105 will operate actuator 95 either to raise crosshead 109 or to lower the same, and thus either to separate the two mold halves or to reclose the same. Thus, the molds may be readily charged and a molded article readily moved therefrom with minimum effort and with a minimum delay time. This greatly increases the efficiency and productivity of the molding apparatus.

In that embodiment of the invention shown in FIGS. 10, 11 and 12, the interior construction of the molds is essentially identical with that of the molds 60 and 60'. However, the arrangement of FIGS. 10, 11 and 12 is more compact and requires less room. As certain parts in FIGS. 10, 11 and 12 are identical with corresponding parts of FIGS. 1 through 9, they have been given the same reference characters.

Referring to FIGS. 10, 11 and 12, a frame 120 is supported upon uprights 15, and particularly upon cross members 17 of uprights 15, for rotation about the axis of trunnions 125 and 125', the support arrangement being the same as that of FIGS. 1 through 9. Frame 120 is substantially rectangular in plan, including cross members 121, 121, each secured to a trunnion 125 or 125', and side members 123. Frame 120 is thus rotatable about the common axis of sleeve trunnions 125 and 125'. A mold table 115 is mounted within the confines of frame 120 for rotation or oscillation about a second axis which is perpendicular to the common axis of trunnions 125 and 125'. A pair of inner mold halves 60', 60', are secured to opposite surfaces of mold table 115. Each inner mold half 60', 60' has associated therewith an outer mold half 60, 60.

The outer mold halves 60 differ from those of FIGS. 1 through 9 only in that, adjacent the mold parting plane, each mold half 60 has a peripheral flange 116 provided with a pair of ears 117. The ears 117 of each mold half 60 are secured to the piston rods 108 of a pair of fluid pressure actuators 95 mounted on mold table 115, there being two actuators 95 in longitudinal alignment with each other, and facing in opposite directions, on each of a pair of opposite surfaces of mold table 115. The interior of mold table 115 is provided with a hydraulic or pressure fluid reservoir which is associated with the pump operated by a handle 105, there being one handle 105 associated with each pair of actuators 95 for a respective mold half 60. Frame 120 is rotated or oscillated about the common axis of sleeve trunnions 125, 125' by a motor 40 positioned on a support 41 and driving a reduction gearing 42. Reduction gearing 42 has an output sprocket which, through a chain 44, drives a sprocket 45 secured to sleeve trunnion 125'.

The mold table 115 with the molds thereon is rotated or oscillated about sleeve trunnions 118 each secured at one end to the mold table and each rotatable or oscillatable in an aperture through a side member 123 of frame 120. A drive motor 50 positioned beneath support 41 drives a reduction gearing 53 through a variable speed drive 52. Reduction gearing 53 has an output sprocket which is connected, by a chain drive 54, to drive a relatively large driven sprocket 122 fixed to a sleeve 124 rotatable on trunnion 125. A smaller sprocket 126 is also fixed to sleeve 124 and, through a chain drive 127, drives meshing bevel pinions 128, these beveled pinions being disposed in a recess at the junction of a pair of members 121 and 123 of the frame 120. Bevel pinions 128 act as a right angle drive for a sprocket 112 which, through a chain 113, drives a large sprocket 114 secured to a sleeve trunnion 118, and whereby the rotation of sprocket 114 or the oscillation thereof will correspondingly rotate or oscillate the mold table 115.

The system for supplying heating or cooling fluid to chambers 70, 70' of molds 60, 60' is as follows. The outlet of a pump 130 is connected to an inlet pipe 131 which is, in turn, connected to the inlet of a rotatable type of fixture 132 which may be the same as the fixture or fitting 82 of FIG. 3. A shut-off valve 133 is provided in inlet pipe 131, and a drain, controlled by a valve 134, is connected to the pipe 131. Rotary fitting 132 is connected to a hollow shaft 136 which communicates with a pipe 137 extending along an end member 121 and a side member 123 of frame 120. At the inner end of pipe 137, a conduit 138 connects the latter to a rotary fitting 139, which is the same as the fitting 132, and directs fluid inwardly through the hollow shaft or sleeve 118 to a T fitting on mold table 115, this T fitting being connected by flexible conduits 94 to elbows 96 connected to the inlet nipples to the heating and cooling chambers 70, 70'. Fluid leaves chambers 70, 70' by way of elbows 97, 97' connected by flexible conduits 98, 98' to the branches of a T fitting having a stem communicating with the interior of the other sleeve trunnion or hollow shaft 118. Through a suitable pipe, the interior of this other sleeve trunnion 118 is connected to a rotary fitting 141, identical with fitting 139, and a conduit 142 connects fitting 141 to a pipe 143 on a side member 123 of frame 120. A conduit 144 connects pipe 143 to a suitable bore in a cross member 121, this latter bore being connected to the interior of the sleeve trunnion 125' and from there, through a rotary fitting 145, to an outlet or return pipe 146.

Conduit 146 is connected into a common return line 147 provided with solenoid operated valves 148 and 149 on either side of its junction to conduit 146. Solenoid valve 148 establishes communication between conduit 146 and the coil 151 of a cooling heat exchanger 150. The other end of coil 151 is connected to a coolant reservoir 135 provided with a jacket 152. Reservoir 135 is connected through a line 153 to a common line 154 connected to the inlet of pump 130. A solenoid valve 155 is disposed in line 153 just in advance of its junction with line 154.

The end of line 147 is connected to a filling line 156 for a heater 140 which may be heated by a combustible fuel or by electricity, and the pump inlet line 154 has its inlet end connected to the heater 140, this inlet line being provided, in advance of its junction with the line 153, with the solenoid valve 157. Filling line 156 is provided with a hand operated valve 158, and an air bleed valve 159 is provided for the reservoir 135.

The same fluid is used both as the coolant and as the heating fluid. By suitable control of the several valves mentioned, either heating fluid drawn from heater 140 or coolant drawn from reservoir 135 may be circulated by pump 130 and inlet pipe 131 to the cavities 70, 70′ of the molds, and returned through outlet pipe 146 to the appropriate source, either the reservoir 135 or the heater 140.

The arrangements described in FIGS. 1 through 9 and FIGS. 10 through 12 operate generally in the following manner. The molds are opened and suitable charges of the raw material, such as polyethylene or polyvinyl chloride, are placed within the mold cavities. The molds are then closed and heating fluid is directed through the system to heat the molds. At the same time, frames 20 or 120 are rotated or oscillated about their respective axes and the molds are rotated or oscillated about an axis perpendicular to the axis of rotation of the frames, while continuing the heating of the molds. The heating and the rotation are continued for a sufficient time to allow the charge of molding material, such as the aforementioned polyethylene or polyvinyl chloride, to be uniformly distributed over the surfaces of the mold cavities and thus to form the hollow molded article, for example, the battery fillers illustrated in the drawings. After this time has elapsed, the flow of heating fluid is terminated and cooling fluid is circulated around the molds to cool the plastic material, with the rotation of the molds continuing for a short time and then being stopped. After the molded articles have cooled, the molds are opened by operating the pump handles, such as 105, and the molded articles are removed from the molds, after which the molds are provided with a new charge of molding material, the molds are reclosed, and the cycle is repeated.

In the embodiment of the invention shown particularly in FIGS. 1, 2 and 3, there is a motor 40 provided to rotate the table 20 about its axis of rotation or oscillation, and a second motor 50 is mounted on the table 20 to rotate the molds about their center of rotation or oscillation on the table 20. It will be appreciated that, due to the rotation or oscillation of frame or table 20, it will be necessary to supply current to the motor 50 through sliprings or the like. The necessity for using such slip-rings can be obviated by mounting the mold rotating motor 50 on one of the frames 15 and connecting it by mechanical means to a gear reducer mounted on the table or frame 20. Such an arrangement is illustrated in FIGS. 13, 14 and 15.

Referring to FIGS. 13, 14 and 15, the mold rotating motor 50 is mounted on a lower cross member 17 of one frame 15 and, through a belt 161, drives a pulley 162 which is rotatable upon the hollow trunnion or sleeve 25 and is integral with a sprocket 163. Sprocket 163 abuts sleeve 26 secured to cross member 21 of frame 20. A collar 164 is pinned to trunnion 25 adjacent the outer surface of pulley 162.

Through an endless chain 166, sprocket 163 drives a sprocket 167 on a shaft 168 mounted in bearings 169 suitably supported upon the table 51. Shaft 168 is coupled to the input shaft of the gear reducer 53 mounted on the table 51 and, from gear reducer 53 on, the drive is the same as described in connection with FIGS. 1, 2 and 3. As in FIG. 2, the table rotating motor 40 drives gear reducer 42 and the latter, through chain or belt-drive 44, drives the sprocket or pulley 45 which is keyed, pinned or otherwise secured against rotation on sleeve or trunnion 25.

It is desirable that the upper mold halves 60, when lifted from the lower and fixed mold halves 60′, be capable of being swung out of the way to facilitate removal of the molded articles and recharging of the molds. An arrangment providing this is shown in FIGS. 16, 17 and 18. Referring to these figures, the wall 36′ on the drive side of the housing 30′ has its upper lefthand corner beveled off as at 171. The opposite wall 36′ is made of very reduced height, having a total height of only about two-thirds that of the corresponding wall 36 shown in FIGS. 1, 2 and 3. The actuator 95 is mounted adjacent the corner formed by the wall 36′, of lesser height, and a wall 37′. The other wall 37′ is omitted almost entirely except for a short section 172 enclosing the reservoir and pump 100 associated with the pump handle 105 and the selector valve 110.

Due to these various provisions, including the particular location of the actuator 95, the upper mold half 60, when moved upwardly to separate the mold halves 60 and 60′, may be swung outwardly about the axis of piston rod 108. To accommodate this, the fluid inlet flexible conduits 94 and the fluid outlet flexible conduits 98, associated with the upper mold half 60, are made substantially longer than in the embodiment of the invention previously described. In particular, the fluid inlet cable 94 is secured by a clamp 173 to the upper surface of the arm 109. By virtue of being able to swing the upper mold half 60 laterally out of the way of the lower mold half 60′, and to the position shown in dotted lines in FIG. 17 and in full lines in FIG. 18, access to the molded articles for removal from the molds is rendered much easier. Except for the variations in construction just described, the arrangement shown in FIGS. 16, 17 and 18 is the same as that shown in FIGS. 1 through 9. It will be appreciated that this swinging arrangement for the upper mold half may be embodied in the mold constructions shown in FIGS. 1 through 12.

FIGS. 19 and 20 show an arrangement whereby various forms of molds may be readily interchanged in either of the two mold halves 60 and 60′. In this case, the isolating wall means, indicated at 61 and 61′ in the embodiment of the invention shown in FIGS. 1 through 9, is in the form of a flat plate 175, 175′. A sealing gasket 176, 176′ is placed around the inner periphery of walls 63 and 63′, respectively, of the upper and lower mold halves 60 and 60′, respectively. These sealing gaskets are interposed between the peripheries of these walls and the plates 175, 175′, which latter are anchored in fluid-tight relation to the walls 63, 63′ by studs or bolts 177, 177′. This forms a fluid-tight seal between the wall means 175, 175′ and the walls 63, 63′, respectively.

As best seen in FIG. 19, each plate such as the plate 175, is formed with a series of openings 180 therein each conforming peripherally to the hollow part of a mold cavity. These apertures 180 are arranged to receive interchangeable mold elements 170, 170′ each including a mold cavity portion 174 and a peripheral flange 178. Flanges 178, 178′ are formed with a series of apertures spaced therealong to receive studs 181, 181′ engageable in threaded apertures 182, 182′ in the plates 175, 175′. Suitable gaskets may be interposed between flanges 178, 178′ and the respective plates 175, 175′ if necessary or desirable to form a fluid-tight seal between the mold elements 170, 170′ and the respective plates 175, 175′.

When the upper and lower mold halves 60 and 60′ are moved into mold closing relation, the mold elements 170, 170′ are interengaged at parting lines 183 to complete the mold cavities. The arrangement of FIGS. 19 and 20 provides for very ready interchange of molds, such as 170, and it will be noted that plates 175 may be readily removed and replaced where it is desired to provide a plate having a different form of aperture therein for receiving a different form of mold element 170 or 170′.

Due to the fact that the heating fluid may have a temperature of the order of 500° F. or higher, with the cooling fluid having a temperature of from 100° F. to 150° F., for example, expansions are provided where necessary as, for example, at the inlet of the pump. The fluid circulating system is a totally enclosed system and a surge tank (not shown) is provided to accommodate expansion and contraction of the circulating medium.

While specific embodiments of the invention have been shown and described in detail to illustrate the application of the principles of the invention, it will be understood that the invention may be embodied otherwise without departing from such principles.

What is claimed is:

1. Apparatus for molding hollow articles from a natural or synthetic resin comprising, in combination, a mold including a first half and a second half releasably interengageable at a parting plane to define a complete mold cavity; means mounting said mold for rotation about at least one axis; each mold half including wall means defining a partial mold cavity opening toward the partial mold cavity in the other mold half, and wall means defining a chamber for interchangeably receiving heating fluid and fluid coolant; said wall means including a transverse imperforate wall of heat conductive material fluid-tightly isolating said partial mold cavity from said chamber; and fluid inlet means and fluid outlet means for said chamber independent of said partial mold cavity, a housing supporting said mold; said first mold half being fixedly mounted on said housing; a fluid pressure actuator secured to said housing and including a movable element connected to said second mold half; and manually operable means mounted on said housing and effective to supply pressure fluid to said actuator to separate said second mold half from said first mold half, in one condition of operation of said manually operable means and, in another condition of operation of said manually operable means, to supply pressure fluid to said actuator to reengage said second mold half with said first mold half said fluid pressure actuator comprising a piston, having a piston rod extending therefrom, a cylinder, said piston and piston rod constituting said movable element; said housing being constructed and arranged to provide for swinging of said second mold half about the axis of said piston rod and laterally of said housing when said second mold half is separated from said first mold half.

2. Apparatus for molding hollow articles from a natural or synthetic resin comprising, in combination, a mold including a first half and a second half releasably interengageable at a parting plane to define a complete mold cavity; means mounting said mold for rotation about at least one axis; each mold half including mold wall means defining a partial mold cavity opening toward the partial mold cavity in the other mold half, and chamber wall means defining with said mold wall means a chamber for interchangeably receiving heating fluid and fluid coolant; said mold wall means including a transverse imperforate wall of heat conductive material fluid-tightly isolating said partial mold cavity from said chamber; a pair of fluid inlet means respectively communicating with said chambers through the pair of chamber wall means and a pair of fluid outlet means respectively communicating with said chambers also through said pair of chamber wall means; supply conduit means having branches respectively communicating with said pair of fluid inlet means for simultaneously supplying fluid thereto; discharge conduit means having branches respectively communicating with said pair of fluid outlet means for respectively receiving fluid simultaneously therefrom so that said chambers are connected in parallel to said supply conduit means and discharge conduit means to provide for simultaneous flow of fluid in said chambers; and a liner of heat and cold reflective material covering the inner surface of each chamber except for said transverse imperforate wall, and heat insulation material carried by each of said chamber wall means at the exterior thereof.

3. Apparatus for molding hollow articles from a natural or synthetic resin comprising, in combination, a mold including a first half and a second half releasably interengageable at a parting plane to define a complete mold cavity; means mounting said mold for rotation about at least one axis; each mold half including wall means defining a partial mold cavity opening toward the partial mold cavity in the other mold half, and chamber wall means defining with said mold wall means a chamber for interchangeably receiving heating fluid and fluid coolant; said mold wall means including a transverse imperforate wall of heat conductive material fluid-tightly isolating said partial mold cavity from said chamber; a pair of fluid inlet means respectively communicating with said chambers through the pair of chamber wall means and a pair of fluid outlet means respectively communicating with said chambers also through said pair of chamber wall means; supply conduit means having branches respectively communicating with said pair of fluid inlet means for simultaneously supplying fluid thereto; and discharge conduit means having branches respectively communicating with said pair of fluid outlet means for respectively receiving fluid simultaneously therefrom so that said chambers are connected in parallel to said supply conduit means and discharge conduit means to provide for simultaneous flow of fluid in said chambers and in which each mold half includes in said chamber thereof a perforated, transverse, flat, fluid-distributing partition extending across its chamber generally parallel to said mold wall means thereof and dividing its chamber into an inlet section and an outlet section of a substantially greater volume than said inlet section; said fluid inlet means communicating with the fluid inlet section and said fluid outlet means communicating with the fluid outlet section.

4. Apparatus for molding hollow articles from a natural or synthetic resin comprising, in combination, a pair of spaced upright supports; a frame including a first member extending between said supports and mounted therein for rotation about a first axis extending longitudinally of said first member, a second member extending transversely of said first member, and at least one third member secured to said second member and extending in spaced parallel relation to said first member; a housing disposed between said first and third members and mounted in the latter for rotation about a second axis perpendicular to said first axis; a mold mounted in said housing and including a first half and a second half releasably interengageable at a parting plane to define a complete mold cavity, said mold being rotatable about said second axis with said housing; each mold half including wall means defining a partial mold cavity opening toward the patrial mold cavity in the other mold half, and wall means defining a chamber for interchangeably receiving heating fluid and fluid coolant; said wall means including a transverse imperforate wall of heat conductive material fluid-tightly isolating said partial mold cavity from said chamber; fluid inlet means and fluid outlet means for said chamber independent of said partial mold cavity; a source of fluid; and conduit means connecting said source to said fluid inlet means and said fluid outlet means, said conduit means extending along said first frame member and along said second axis to said housing, and including universal connections having relatively rotatable fluid-tight components; one of said mold halves being mounted fixedly on said support and the other mold half being mounted on said support for movement toward and away from said one mold half.

5. Apparatus for molding hollow articles, as claimed in claim 4, including a fluid pressure actuator mounted on said support and connected to said second mold half; a source of pressure fluid mounted on said support; and a manually operable pump connected between said actuator and said sorce of pressure fluid and effective, in one condition of operation, to operate said actator to separate said second mold half from said first mold half and, in the other condition of operation, to move said second mold half into sealing engagement with said first mold half.

6. Apparatus for molding hollow articles, as claimed in claim 4, in which there are a pair of third frame members positioned on opposite sides of said first frame member, and a pair of housings, each positioned between a respective third member and said first frame member.

7. Apparatus for molding hollow articles, as claimed in claim 4, including power driving means; and first driving connections from said power driving means to said frame to effect rotation thereof about said first axis; and second driving connections extending from said first driving connections and connected to said housing to rotate the same about said second axis simultaneously with rotation of said frame about said first axis.

8. Apparatus for molding hollow articles, as claimed in claim 7, in which said power driving means comprise first and second electric motors; said first electric motor being fixedly mounted on one of said upright supports and said second driving motor being mounted on said frame; said first driving motor being connected, by said driving connections, to rotate said frame about said first axis, and said second driving motor being connected, by said driving connections, to rotate said housing about said second axis.

9. Apparatus for molding hollow articles from a natural or synthetic resin comprising, in combination, a pair of spaced uprights; a substantially rectangular frame supported in bearings on said uprights for rotation about a first axis; a mold including a first half and a second half releasably interengageable at a parting plane to define a complete mold cavity; means mounting said mold for rotation on said frame about a second axis substantially perpendicular to said first axis; each mold half including wall means defining a partial mold cavity opening toward the partial mold cavity in the other mold half, and wall means defining a chamber for interchangeably receiving heating fluid and fluid coolant; said wall means including a transverse imperforate wall of heat conductive material fluid-tightly isolating said patrial mold cavity from said chamber; fluid inlet means and fluid outlet means for said chamber independent of said patrial mold cavity; a source of fluid; and conduit means connecting said source of fluid to said fluid inlet means and said fluid outlet means, said conduit means extending through said supports and along said frame.

10. Apparatus for molding hollow articles, as claimed in claim 9, in which said first mold half is secured to said frame for rotation about said second axis, said second mold half being displaceable relative to said first mold half; and fluid pressure actuator means interconnecting said first and second mold halves and effective to displace said second mold half relative to said first mold half.

11. Apparatus for molding hollow articles, as claimed in claim 10, in which there are a pair of molds with said first mold halves being arranged in back-to-back relation, and said molds extending in opopsite directions from said first and second axis and normal thereto.

12. Apparatus for molding hollow articles, as claimed in claim 9, in which said source of fluid includes a source of heating fluid and a source of fluid coolant; said conduit means including valve means selectively effective to direct either heating fluid or fluid coolant through said chamber.

13. Apparatus for molding hollow articles from a natural or synthetic resin comprising, in combination, a mold including a first half and a second half releasably interengageable at a parting plane to define a complete mold cavity; means mounting said mold for rotation about at least one axis; each mold half including wall means defining a partial mold cavity opening toward the partial mold cavity in the other mold half, and wall means defining a chamber for interchangeably receiving heating fluid and fluid coolant; said wall means including a transverse imperforate wall of heat conductive material fluid-tightly isolating said partial mold cavity from said chamber; fluid inlet means and fluid outlet means for said chamber independent of said partial mold cavity; in which said transverse imperforate wall comprises a substantially flat plate formed with plural apertures each conforming to the hollow portion of a mold cavity element; and plural mold cavity elements such having a hollow portion extending through a respective one of said apertures, and a peripheral flange for connection to said plate; said mold cavity elements being interchangeably mounted on said plate and, when so mounted, conjointly forming therewith said imperforate wall.

14. A machine adopted to cast hollow articles rotationally comprising a mold whose walls define a mold cavity and include a passage for heat-transfer fluid to heat and/or cool the cavity surface, a spindle assembly upon which said mold is supported, a frame, a bearing carried by said frame for rotatably supporting said spindle, frame-support means, and a frame-supporting bearing carried by said frame-support means, means to rotate said spindle and said frame in said bearings, a source of heat-transfer fluid, means including a rotary seal for conducting fluid from said source through said frame-supporting bearing concentrically with the axis thereof, and means including a rotary seal for conducting heat-transfer fluid from said frame-support bearing past said spindle support bearing to said mold passageway and including a second frame-supporting bearing and in which said frame-support means includes a pair of bearing-supporting members coaxially supporting said first frame-supporting bearing and the second frame-supporting bearing, means including a rotary seal for conducting fluid concentrically through said second frame-supporting bearing to said fluid source, and means including a rotary seal for conducting said fluid from said mold passageway past a spindle bearing to said second frame-supporting bearing, whereby fluid may be conducted from said source successively through said first frame-supporting bearing to said mold and from said mold through said second frame-supporting bearing for return to said source.

15. A machine adapted to cast hollow articles rotationally comprising a mold having a hollow cavity and a passage through the mold for heat-transfer fluid to vary the temperature of the mold cavity surface, a spindle assembly upon which said mold is mounted, a frame, inlet and outlet fluid conduit means in said frame, a pair of axially aligned bearings carried by said frame, on which bearings said spindle assembly is mounted, means, including a rotary seal at each of said spindle bearings, for conducting fluid from said inlet conduit means substantially concentrically through one of said spindle bearings to said mold passage and from said mold passage substantially concentrically through the other of said spindle bearings to said outlet fluid conduit means, bearing means in which said frame is rotatably mounted, means for supporting said frame bearing means, means to rotate said frame and said spindle assembly in their respective bearings, said frame bearing means being supported so that an extension of its axis lies within and intersects the solid of revolution generated by said mold when said frame and spindle means are simultaneously rotated, means, including rotary seals, for connecting said inlet and outlet conduit means to a reservoir of heat-transfer fluid, whereby heat-transfer fluid may be circulated through said mold passage to vary the temperature of said mold cavity while said mold is capable of being simultaneously rotated about two diverse axes.

16. A machine as defined in claim 15 including mean to heat and cool said heat-transfer fluid and means allowing heated and cooled heat-transfer fluid to be conducted to said mold in successive phases which may be of unequal duration.

References Cited
UNITED STATES PATENTS

| | | | |
|---|---|---|---|
| 2,536,692 | 1/1951 | Miller | 18—26 X |
| 2,740,159 | 4/1956 | Berg | 18—25 |
| 2,862,237 | 12/1958 | Rekettye | 18—26 |
| 3,095,260 | 6/1963 | Ferriot | 18—26 X |
| 3,117,346 | 1/1964 | Bertin et al. | 18—26 |
| 3,173,175 | 3/1965 | Lemelson. | |

WILLIAM J. STEPHENSON, Primary Examiner

U.S. Cl. X.R.

249—79